Figure 1:
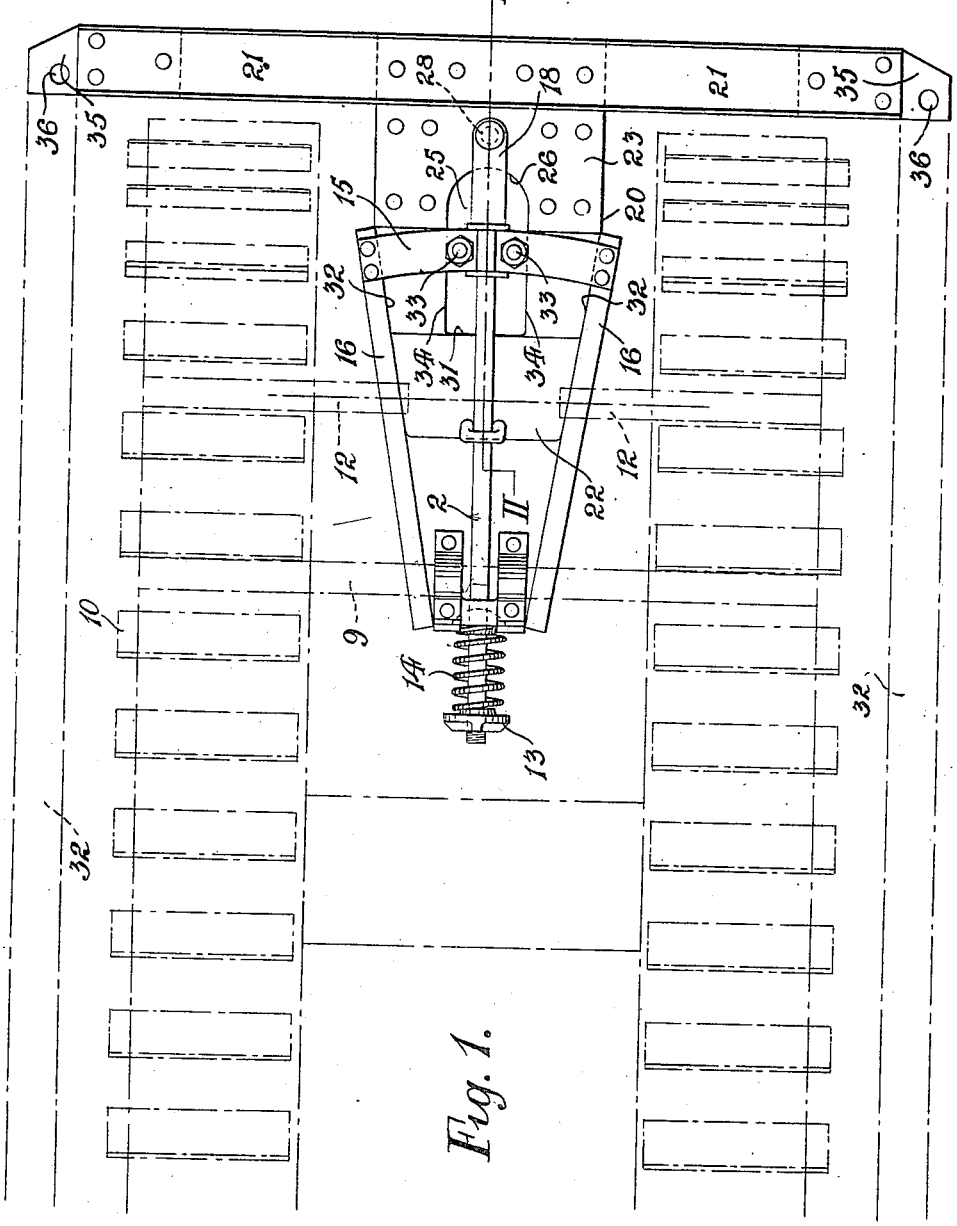

Oct. 25, 1927. 1,646,751
C. L. HUSSEY
MEANS FOR ATTACHING SNOWPLOWS, BACK FILLERS, AND THE LIKE
TO THE DRAWBARS OF TRACTORS
Filed Dec. 1, 1926    2 Sheets-Sheet 1

Chester L. Hussey Inventor
By his Attorneys.
Marks + Clerk

Oct. 25, 1927.  1,646,751
C. L. HUSSEY
MEANS FOR ATTACHING SNOWPLOWS, BACK FILLERS, AND THE LIKE
TO THE DRAWBARS OF TRACTORS
Filed Dec. 1, 1926    2 Sheets-Sheet 2

Chester L. Hussey Inventor
By his Attorneys
Marks & Clerk

Patented Oct. 25, 1927.

1,646,751

UNITED STATES PATENT OFFICE.

CHESTER L. HUSSEY, OF HOLYOKE, MASSACHUSETTS.

MEANS FOR ATTACHING SNOWPLOWS, BACK FILLERS, AND THE LIKE TO THE DRAW-BARS OF TRACTORS.

Application filed December 1, 1926. Serial No. 151,854.

This invention relates to improved means for attaching snow plows, back fillers or the like to the draw-bars of tractors.

The draw-bars of tractors are designed for the purpose of attaching thereto a load which is to be drawn by the tractor and such draw-bars are usually connected at their forward end to the tractor by a swivel joint so that the draw-bar may oscillate a certain limited extent in a horizontal plane. The connection to the swivel joint is such as to allow of a movement of the draw-bar in a longitudinal direction relatively thereto, the amount of such sliding movement being controlled by resilient means. The provision allowing of such sliding movement under the control of resilient means is practically essential if undue strain on the tractor body is to be avoided. Such provision is also necessary if the full power of the tractor is to be utilized since it is a fact generally known that the starting pull of a tractor is much greater if resilient means are provided between the tractor and the load.

Attachments such as snow plows, back fillers or the like are placed in front of the tractor and it has been customary to connect such attachments to the rear portion of the tractor by means of a beam extending transversely of the tractor at the rear thereof and push bars extending longitudinally of the tractor at each side thereof and connected respectively to the two ends of the transverse beam.

Difficulties have been experienced in connecting such a beam to the rear portion of the tractor in such a manner as to take advantage of the spring connection provided by the draw-bar since it is essential that the connection must be one that will practically eliminate any side movement of the beam and will also eliminate any tendency of the beam to tilt in a horizontal or vertical plane.

The primary object of the present invention is to provide a connection between the transverse beam and the draw-bar which, while allowing of the usual longitudinal movement of the draw-bar, will eliminate any tendency of the beam to tilt in either a vertical or horizontal plane and which will also practically eliminate any side movement of the beam.

In order that the invention may be clearly understood reference is made to the accompanying drawings which illustrate by way of example an embodiment of my invention and in which:—

Figure 2:
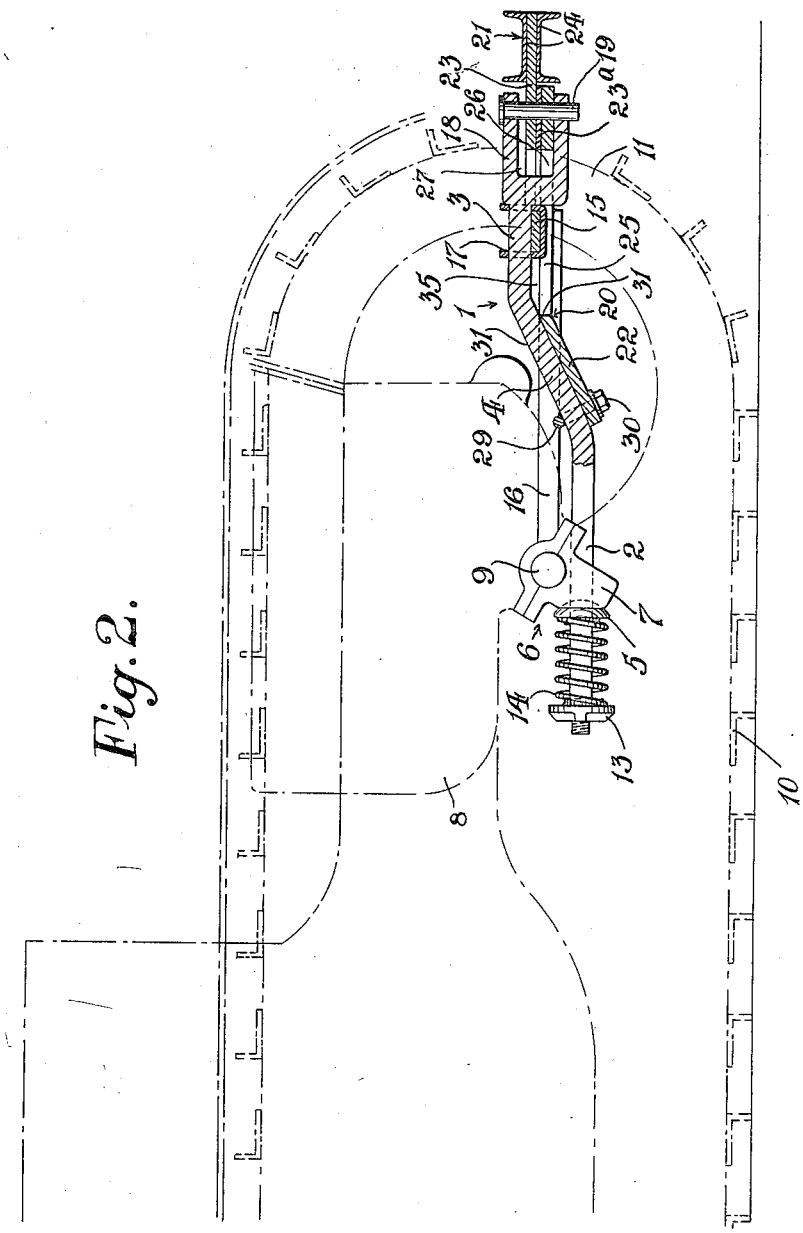

Figure 1 is a plan view of my improved connection showing portions of the tractor in chain dotted lines and Fig. 2 is a sectional view on line II—II of Fig. 1 also showing portions of the tractor in chain dotted lines.

These drawings illustrate the usual type of draw-bar which comprises a bar 1 comprising forward and rear portions 2 and 3 extending substantially horizontally and connected together by means of an inclined portion 4, the rear portion 3 being in a higher plane than the forward portion 2. The forward portion 2 of the draw-bar is slidingly mounted within one portion 5 of the swivel joint 6, the other portion 7 thereof being mounted on the under side of the crank case 8 preferably adjacent the idler shaft 9 which is adapted to drive the track assemblies 10 of the tractor which at the rear end of the machine pass around the wheels 11 mounted on the shafts 12.

A nut or collar 13 is mounted on the forward end of the forward portion 2 of the draw-bar by means of a screw-threaded connection. Between the nut or collar 13 and the portion 5 of the swivel joint is mounted a spring 14 of suitable strength. Springs are commonly employed for this purpose which require for example a force of from 3500 to 4500 lbs. to compress them one inch and the maximum amount of sliding movement usually allowed for such draw-bar is about 2½".

The rear end 3 of the draw-bar is supported upon a plate 15 which is of sector shape extending transversely of the tractor in a horizontal plane; such plate 15 is supported on the frame work of the tractor by means of bars 16 to which the outer ends of the plate 15 are connected and which are connected to or are integral with the gear case 8. Said rear end 3 is held down in slidable engagement with the upper face of the plate 15 by means of a U-shaped bracket 17 which is provided with bearing openings in its upstanding sides in which the said rear portion 3 of the draw-bar 1 is slidingly mounted. Such a mounting will allow of a longitudinal movement of the draw-bar 1 and also of an oscillating movement of the draw bar 1 about the swivel joint 6 in a horizontal plane.

To the rear end of the rear portion 3 of the draw-bar 1 is connected a clevis 18 which supports a draw-pin 19 by which the load to be drawn is adapted to be connected to the draw-bar.

The clevis 18 may be integral with the draw-bar or may be connected thereto in any suitable manner. The clevis 18 is adapted to abut against the U-shaped bracket 17 and thereby to limit the sliding movement of the draw-bar 1 under the influence of the spring 14 in a forward direction.

According to my invention a plate 20 is connected at its rear end to the cross beam 21 to which the snow plow or the like is adapted to be connected. Such plate extends forwardly of the beam 21 and is of a width at its intermediate portion adapted to fit snugly between the longitudinal members 16 to which the ends of the transverse sector shaped plate 15 are connected. The forward portion 22 of the plate 20 is bent at an angle to the intermediate portion thereof, such angle corresponding to that at which the intermediate portion 4 of the draw-bar is inclined to the rear portion 3 thereof. The plate 20 is attached to the cross beam 21 in any suitable manner. In the form illustrated it is attached to the cross beam 21 through the intermediary of a plate 23 which has its rear end clamped and riveted between upper and lower channel beams 24 of which the cross beam 21 is formed. The rear end of the plate 20 is riveted to that portion of the plate 23 which projects forwardly of the cross beam, preferably on the underside thereof as shown with a packing plate 23ª interposed between the two. The plate 23 extends forwardly of the cross beam 21 a distance corresponding to the distance between the forward face of the cross beam 21 and the rear edge of the transverse plate 15 when the cross bar is mounted on the draw-bar and the draw-bar is in its normal position. The central portion of the plate 20 and the forward portion of the plate 24 are recessed at 25, the width of such recess being somewhat greater than the width of the clevis 18 and of the U-bracket 17. Such recess is provided so that the plate 20 may be mounted on the draw-bar with its upper face abutting against the lower face of the plate 15 and with the portion between the rear edge 26 of such recess and the cross beam 21 engaging within the jaw 27 of the clevis 18. Extending through the plates 20 and 24 intermediate the rear edge 26 of the recess 25 and the forward face of the cross beam 21 is a hole 28 which is adapted to receive the draw-pin 19 normally supported in the clevis 18. The forward inclined portion 22 of the plate 20 is clamped to the intermediate portion 4 of the draw-bar 1 by means of a U-bolt 29 which embraces said portion 4 of the draw-bar and which extends through suitably positioned holes in the forward part of the aforesaid portion 22. Nuts 30 engage the screw-threaded ends of the bolt 29 and thereby securely clamp the forward end of the plate 20 to the draw-bar.

The plate 20 with the cross beam 21 is rigidly secured to the end of the draw-bar 1 by such a connection, but the connection is such as will not prevent the longitudinal sliding movement of the draw-bar, since, though the transverse plate 15 is embraced between the rear portion 3 of the draw-bar which engages on its upper side, and the plate 20 which engages against its lower side, a space 35 between the lower face of the rear portion 3 of the draw-bar and the upper face of the intermediate portion of the plate 20 is provided which will allow of such longitudinal movement relatively to the transverse plate 15. The recess 25 is of such a length that the forward edge 31 thereof will not contact with the U-bracket 17 to limit such movement.

This connection, however, is of such a nature that tilting of the cross beam 21 in a vertical plane will be entirely eliminated owing to the fact that the upper face of the plate 20 is held tightly against the lower face of the plate 15, the engagement between the plates 15 and 20 extending over the greater portion of the area of said plate 15. The connection is also of such a nature that a tilting movement of the cross beam 21 in a horizontal plane is entirely eliminated since the cross beam 21 is connected to the draw-bar 4 at two points spaced apart longitudinally thereof, such points being respectively at the forward and rear ends of the plate 20 namely where connections are made by the U-bolt 29 and by the pin 19.

When the draw-bar is in its normal position with the spring 14 extended, side movement of the cross beam 21 will be entirely eliminated owing to the face that the side edges 32 of the intermediate portion of the plate 20 engage against the inner sides of the bars 16.

Owing to the fact, however, that the bars 16 converge outwardly towards their rear ends, a sliding movement of the draw-bar 1 and the plate 20 rigidly secured thereto, against the tension of the spring 14 will cause a certain amount of clearance between the side edges of the intermediate portion of the plate 20 and the inner sides of the bars 16. Since, however, the maximum amount of longitudinal movement is not more than 2½″ and the bars 16 are inclined to the longitudinal axis of the tractor at a very acute angle, the clearance which would be caused by such longitudinal movement will only be slight and would not allow of sufficient side movement of the cross bar 21 to cause any interference between the push bars 32 and the sides of the tractor, which it is the object of this invention to prevent.

In order, however, to prevent any side movement of the cross bar 21 even when the spring 14 is under compression during the starting of the tractor, bolts 33 are mounted in holes provided in the plate 15, the centers of such holes being such that the heads of the bolts when filed flush with the edge of the shank thereof on their inner sides will engage against the side edges of the base portion of the U-shaped bracket 17. The width of the recess 25 is also such that the side edges 34 thereof will engage against the outer sides of the heads of the bolts 33.

Suitable means are provided at the ends of the cross beam 21 for connecting the push bars 32 thereto. Such means preferably comprise plates 35 extending between the spaced channel sections 24, and riveted therebetween. The projecting portions of such plates are provided with holes 36 adapted to receive pins or bolts mounted respectively in the rear ends of said push bars.

The embodiment illustrated in the drawing is given by way of example only and various modifications could be made therein without departing from the spirit and scope of the invention as defined in the accompanying claims.

What I claim is—

1. Means for connecting a cross beam to the draw-bar of a tractor which is longitudinally movable against resilient means comprising a member extending longitudinally of the draw-bar and connected to the cross beam such member being adapted to be connected to the draw-bar at its forward and rear ends and adapted to engage the draw-bar support in such manner that tilting of the cross beam in a vertical or a horizontal plane, and side movement thereof is substantially prevented while the longitudinal movement of the draw-bar is unrestricted.

2. Means for connecting a cross beam to the draw-bar of a tractor which is longitudinally movable against resilient means, comprising means connected to the cross beam and adapted to be connected at its forward and its rear ends to the draw-bar and also adapted to engage at its side edges against longitudinally extending members on the tractor in such manner that the longitudinal movement of the draw bar is unrestricted while tilting of the cross beam in a horizontal or vertical plane is substantially prevented in all positions of the draw-bar.

3. The combination with a draw-bar having its forward end slidably mounted within a mounting on the tractor and having its rear end supported on draw bar supporting means and resilient means for controlling the longitudinal movement of the draw-bar, of a cross beam, and a member extending forwardly therefrom, such member being adapted to be connected to the draw-bar and to engage at its side edges against longitudinally extending members on the tractor in such manner that the longitudinal movement of the draw-bar against the tension of said resilient means is unrestricted while tilting of the cross beam in a horizontal or vertical plane is substantially prevented in all positions of the draw-bar.

4. The combination with a draw-bar having its forward end slidably mounted within a mounting on the tractor, a support for the rear end of the draw bar comprising a transverse member connected at its ends to longitudinally extending supporting means, and resilient means for controlling the longitudinal movement of the draw-bar, of a cross beam and a member extending forwardly therefrom such member being adapted to be clamped to the draw-bar and to engage at its opposite side edges respectively against said longitudinally extending supporting members in such manner that the freedom of movement of said draw-bar in a longitudinal direction under the control of said resilient means will be unrestricted while tilting of the cross beam in a horizontal or vertical plane is substantially prevented in all positions of the draw-bar.

5. The combination with a draw-bar having its forward end slidably mounted within a mounting on the tractor and having a draw-pin at its rear end, a support for the rear end of the draw-bar and resilient means for controlling the longitudinal movement of the draw-bar, of a cross beam and a member extending forwardly therefrom, such member extending longitudinally of the draw-bar having means at its rear end for engaging with the draw-pin supported at the rear end of the draw-bar having means at its forward end for clamping said forward end to said draw-bar and being of such width that its longitudinally extending side edges engage longitudinally extending members on said tractor.

6. The combination with a draw bar having its forward end slidably mounted within a mounting on the tractor and having a draw-pin mounted at its rear end, a support for the rear end of the draw-bar comprising a transverse member connected at its ends to longitudinally extending supporting means, and resilient means for controlling the longitudinal movement of the draw-bar, of a cross beam and a member extending forwardly therefrom, such member extending longitudinally of the draw-bar with the transverse member embraced between it and the draw-bar and having means at its rear end for engaging with the draw-pin supported at the rear end of the draw-bar and means at its forward end for clamping said forward end to said draw-bar, the width of said member being such that its longitudinally extending side edges engage longitudinally extending members on the tractor the connection being such as to allow of unrestricted longitudinal movement of the draw-bar under the control of said resilient means while substantially preventing tilting of the cross beam in a horizontal or vertical plane in all positions of the draw-bar.

7. The combination with a draw-bar having its forward end slidably mounted within a mounting on the tractor, a support for the rear end of the draw-bar comprising a transverse member connected at its ends to longitudinally extending supporting means, and resilient means for controlling the longitudinal movement of the draw-bar, of a cross beam and a member extending forwardly therefrom, such member extending longitudinally of the draw-bar with the transverse member embraced between it and the draw-bar and having means at its rear end for engagement with the rear end of the draw-bar and means at its forward end for clamping said forward end to said draw-bar intermediate its rear support and the mounting at its forward end, said member being of such a width that it engages at its side edges against said longitudinally extending supporting members.

8. The combination with a draw-bar having its forward end slidably mounted within a swivel mounting and having a clevis at its rear end supporting a draw-pin, a support for the rear end of the draw-bar comprising a transverse member connected at its ends to longitudinally extending supporting means, and resilient means for controlling the longitudinal movement of the draw-bar, of a cross beam and a member extending forwardly therefrom such member comprising a plate extending forwardly from said cross beam, said plate having a recess intermediate its ends adapted to receive said clevis, means at its rear end adjacent the cross beam for connecting the plate to the draw-pin and means at its forward end for clamping said forward end to the draw-bar, said plate being of such form that it extends below said transverse supporting member when mounted on said draw-bar and provides a space forward of said transverse member between the plate and draw-bar whereby freedom of longitudinal movement of said draw-bar will be unrestricted.

9. The combination with a draw-bar having its forward end slidably mounted within a swivel mounting and having a clevis at its rear end supporting a draw-pin, a support for the rear end of the draw-bar comprising a transverse member connected at its ends to longitudinally extending supporting means, and resilient means for controlling the longitudinal movement of the draw-bar, of a cross beam and a member extending forwardly therefrom such member comprising a plate extending forwardly from said cross beam, said plate having a recess intermediate its ends adapted to receive said clevis, means at its rear end adjacent the cross beam for connecting the plate to the draw-pin and means at its forward end for clamping said forward end to the draw-bar, said plate being of such form that it extends below said transverse supporting member when mounted on said draw-bar and provides a space forward of said transverse member between the plate and draw-bar whereby freedom of longitudinal movement of said draw-bar will be unrestricted, the width of such plate being such that the side edges thereof engage with the longitudinally extending supporting means when mounted on said draw bar.

10. The combination with a draw-bar having its forward end slidably mounted within a swivel mounting and having a clevis at its rear end supporting a draw-pin, a support for the rear end of the draw-bar comprising a transverse member connected at its ends to longitudinally extending supporting means, and resilient means for controlling the longitudinal movement of the draw-bar, of a cross beam and a member extending forwardly therefrom such member comprising a plate extending forwardly from said cross beam, said plate having a recess intermediate its ends adapted to receive said clevis, means at its rear end adjacent the cross beam for connecting the plate to the draw-pin and means at its forward end for clamping said forward end to the draw-bar, said plate being of such form that it extends below said transverse supporting member when mounted on said draw-bar and provides a space forward of said transverse member between the plate and draw-bar whereby freedom of longitudinal movement of said draw-bar will be unrestricted, the width of such plate being such that the side edges thereof engage with the longitudinally extending supporting means when mounted on said draw-bar, means being connected to said plate engaging said cross beam at its rear end and adapted to abut against said transverse supporting plate at its forward end.

11. The combination with a draw-bar having its forward end slidably mounted within a swivel mounting and having a clevis at its rear end supporting a draw-pin, a support for the rear end of the draw-bar comprising a transverse member connected at its ends to longitudinally extending supporting means, and resilient means for controlling the longitudinal movement of the draw-bar, of a cross beam and a member extending forwardly therefrom such member comprising a plate extending forwardly from said cross beam, said plate having a recess intermediate its ends adapted to receive said clevis, means at its rear end adjacent the cross beam for connecting the plate to the draw-pin and means at its forward end for clamping said forward end to the draw-bar said plate being of such form that it extends below said transverse supporting member when mounted on said draw bar and provides a space forward of said transverse member between the plate and draw-bar whereby freedom of longitudinal movement of said draw-bar will be unrestricted, and means mounted on said transverse supporting plate in slidable engagement with the side edges of said recess.

12. Means for connecting a cross beam to the draw-bar of a tractor having a draw-pin supported at its rear end, comprising a member extending forwardly from said cross beam and adapted to extend longitudinally of the draw-bar, means at the rear end of such member adjacent the cross beam for connecting said plate to said draw-pin and means adjacent the forward end of the plate for clamping said plate to said draw-bar.

13. Means for connecting a cross beam to the draw-bar of a tractor which is longitudinally movable against resilient means, has a draw-pin supported at its rear end, and is supported at its rear end upon a transverse supporting member connected at its ends to longitudinally extending supporting means, comprising a member extending forwardly of said cross beam and adapted to extend longitudinally of the draw-bar such member having means at its rear end adjacent said cross beam for connecting the member to the draw-pin of the draw-bar, having means at its forward end for clamping the forward end of said member to said draw-bar and being of such a width that its side edges abut against the longitudinally extending supporting means when it is mounted on said draw-bar.

14. The combination with a draw-bar having its forward end slidably mounted within a mounting on the tractor, a support for the rear end of the draw-bar comprising a transverse member connected at its ends to the tractor and resilient means for controlling the longitudinal movement of the draw-bar, of a cross beam and a member extending forwardly therefrom, said member being adapted to be connected at its rear end adjacent the cross beam to the rear end of the draw-bar, having means at its forward end for clamping said forward end to the draw-bar and being of such a form that it extends below said transverse supporting member when mounted on said draw-bar and provides a space forward of said transverse member between it and the draw-bar whereby freedom of longitudinal movement of said draw-bar will be unrestricted.

15. The combination with a draw-bar having its forward end slidably mounted within a mounting on the tractor, a support for the rear end of the draw-bar comprising a transverse member connected at its ends to longitudinally extending supporting means and resilient means for controlling the longitudinal movement of the draw-bar, of a cross beam and a member extending forwardly therefrom, said member being adapted to be connected at its rear end adjacent the cross beam to the rear end of the draw-bar, having means at its forward end for clamping said forward end to the draw-bar and being of such a form that it extends below said transverse supporting member when mounted on said draw-bar and provides a space forward of said transverse member between it and the draw-bar whereby freedom of longitudinal movement of said draw-bar will be unrestricted, the width of such forwardly extending member being such that the side edges thereof engage with the longitudinally extending supporting means when mounted on said draw-bar.

In testimony whereof I affix my signature.

CHESTER L. HUSSEY.